United States Patent Office 3,036,978
Patented May 29, 1962

3,036,978
DISSOLVED COPOLYMERS OF AQUEOUS SOLUTIONS OF $SO_2$ CONTAINING ACROLEIN AND A MEMBER FROM THE GROUP CONSISTING OF ACRYLONITRILE, METHYL METHACRYLATE, AND VINYL ACETATE
Werner Kern, Rolf Schulz, and Harald Cherdron, Mainz, Germany, assignors to Deutsche Gold- und Silber-Scheideanstalt vormals Roessler, Frankfurt am Main, Germany
No Drawing. Filed July 7, 1959, Ser. No. 825,412
Claims priority, application Germany July 8, 1958
2 Claims. (Cl. 260—29.6)

The present invention relates to a process for the producton of aqueous solutions of $SO_2$ which contain copolymerizates of acrolein and vinyl compounds.

The object of the present invention is to produce aqueous solutions of $SO_2$ in which acrolein-vinyl compound copolymerizates are dissolved.

The technique of producing copolymerizates of the acroleins from acrolein and unsaturated compounds is well known in the field of polymer chemistry. With copolymerization reactions of this type, it is possible to impart to the copolymer thus produced, a combination of the physical and chemical properties which would be found in polymers of each of the several individual components of which the copolymer is composed.

It has already been proposed that acrolein or its substituted derivatives can be polymerized in the presence of sulfurous acid or its anhydride in the presence of water.

Furthermore, the art is aware that polyacroleins or copolymerizates of the acroleins or substituted acroleins which are principally composed of acrolein, can be converted into a form which is soluble in aqueous solutions of $SO_2$ by treating them with an aqueous solution of $SO_2$.

It has now been found, according to the invention, that copolymerizates of the acrolein and vinyl compounds in which the vinyl compounds form the major components can be converted into a form which is soluble in aqueous solutions of $SO_2$ by treating such copolymers with such solutions. It is preferable, in this regard, to use copolymerizates which are composed of acrolein and acrylonitrile.

It is known that polymerizates of vinyl compounds which are insoluble in water also are quite insoluble in aqueous solutions of $SO_2$. It was therefore totally unexpected that the copolymerizates described above are readily soluble in aqueous solutions of $SO_2$, even when they contain only a minor portion of acrolein.

The soluble nature of the copolymerizate, however, is evident only if the acrolein portion of the copolymer consists of about down to 10% of the copolymer. If the copolymer is composed of acrolein and acrylonitrile though, the acrolein content of the copolymerizate can be decreased to about 12% before the solubility of the copolymer in the aqueous $SO_2$ solutions is affected.

The copolymerization process itself can be carried out according to many of the well known processes, but preferably it is conducted by means of a redox catalysis in an aqueous medium. In many cases it is also advantageous to conduct the copolymerization by the well known emulsion polymerization technique. In addition, by a suitable choice of a redox system for the redox catalysis copolymerization it is possible to produce copolymers which are soluble, not only in aqueous solutions of sulfurous acid but also in organic solvents, such as dimethylformamide and pyridine, as well. Examples of such redox systems would include those in which the oxidizing agent was selected from the group consisting of hydrogen peroxide, organic peroxides such as tertiary butyl hydroperoxide or persulfates such as ammonium persulfate, potassium persulfate and so forth and in which the reducing agent was selected from the group consisting of nitrous acid and compounds such as sodium nitrite and isoamylnitrite and others from which nitrous acid can be easily split off as well as iron II salts, silver I salts and titanium III salts.

In the polymerization process employed, the concentration of initiator used should be, at best, 0.001 to 0.05 mole per mole of the monomers. The polymerization reaction temperature should be between 0 and 40° C. Although the pH of the polymerization reaction medium need not be confined within a narrow range, it is recommended, that the reaction be carried out within a neutral to acidic pH range. Furthermore, it is also expedient that molecular oxygen be excluded during the polymerization since otherwise the course of the polymerization reaction as well as the properites of the polymerizates produced will be unfavorably influenced.

White flocculent copolymerizates are produced, which are very easily dissolved, at room temperature and normal pressure, in aqueous solutions of sulfurous acid to form colorless solutions. These solutions begin to become viscous when a copolymerizate content of about 20% by weight is attained therein. However, if these solutions are prepared using acrolein-acrylonitrile copolymerizates, the viscosity becomes evident when a concentration of about only 1.0 to 1.5% by weight is reached. When these solutions are evaporated, clear, solid and insoluble products result. The $SO_2$ excess can be removed extensively in many ways, for example, by evaporation. The solid materials thus produced are stable in the presence of the most common organic solvents as well as water. Increases in temperature will not substantially effect the solubility of these materials. Insoluble films or filaments can be produced from such solutions by common casting or spinning procedures and drying. The properties exhibited by these viscous solutions render them technically valuable products which can be used, for example, as adhesives.

The solutions of copolymers produced by the process according to the invention retain the characteristic properties of their vinyl constituents because of the high percentage of the vinyl components in the copolymer. A special advantage however is that polyvinyl compounds, especially polyacrylonitrile, which by themselves are soluble for the most part only in concentrated salt solutions or in expensive organic solvents, can now be dissolved in dilute aqueous solutions of $SO_2$. In addition, due to the presence of the acrolein constituents in the copolymer it is possible to subject the copolymer to typical aldehyde reactions such as reactions with phenols, amines and the like as well as oxidation, reduction and disproportionation reactions. In carrying out these aldehyde reactions it is expedient to mix the aqueous $SO_2$ solution containing the copolymer with one or more compounds which will react with the aldehyde groups. It is especially suitable to use alcohols or polyalcohols for these reactions. The polyvinyl alcohol can also be reacted in the form of films, filaments and the like with the solutions produced according to the invention. These aldehyde reactions are expediently carried out at elevated temperatures.

The aqueous solutions containing the copolymers can be mixed with appropriate fillers and pigments. The solutions are also suitable for blending with water soluble high molecular substances, with dispersions and with emulsions thereof. The acidic hydroxyl groups of the sulfurous acid that is added on the copolymer can be neutralized with inorganic bases or amines. As need be, however, the pH value of the solution can be adjusted to either an alkaline or acid range.

In addition, any aldehyde hydrate ether group that may also be present can be split by the usual procedures.

Thus, these solutions, produced by the process according to this invention, or the different type mixtures thereof already mentioned above are suitable for surface treatments of natural or synthetic filaments, films and artificial leather such as in finishing, impregnating, coating and so forth. As has already been mentioned previously, filaments or films can be produced directly from these solutions by evaporation techniques. With the use of acrlonitrile as the chief constituent, the copolymers exhibit greater hydrophilic properties than pure polyacrylonitrile. Where expedient the hydrophilic properties of these copolymers can be lessened or varied by mixing them with agents having hydrophobic properties or by treating the films or filaments and the like produced therefrom with hydrophobic agents. It is evident of course that agents retarding ageing can also be incorporated to impart lasting qualities to the filaments and films thus produced.

The copolymer solutions according to the invention can also be used as polymeric emulsifiers and can be used in the production of oil and water emulsions as well as in the production of lacquers.

Furthermore, they can also be used in the treatment of animal hides and leather that have already been tanned. To this end, they can be used either in the pure state or they can be used in combination with the customarily employed tanning agents and chemicals.

When treating the fibers with these solutions it is possible to treat either the individual threads themselves or to treat such threads after they have been associated into fabrics. When it is the surface of the fabrics rather than just the threads that is being treated, it is often sufficient to use a smaller amount of the solution. It is also possible to use the solutions produced according to the invention as additives in aqueous solutions of urea or melamine resins.

In addition, phenol resins can be blended with solutions of this type. The solutions can also be added to natural and synthetic rubber latexes and their concentrates as well as to emulsions of synthetic resins of all types.

The aldehyde groups, that are still present on the acrolein portion of the copolymer after the solution containing the copolymer has been evaporated are still susceptible to the whole range of reactions characteristic of the aldehyde group. For this reason, these copolymer solutions can be used in many useful ways as various types of auxiliary agents.

Example 1

2.3 ml. of destabilized acrolein and 11.5 ml. of destabilized acrylonitrile were added to a solution of 0.91 g. of potassium persulfate in 175 ml. of water and after they were dissolved therein, 0.57 g. of silver nitrate in 25 ml. of water was quickly added dropwise. The temperature was maintained at about 20° C. and the mixture was stirred for about 3 hours while a continuous stream of nitrogen was simultaneously being introduced into the mixture. The precipitating copolymerizate that resulted was sucked off, washed with plenty of water and dried at room temperature in a vacuum over sulfuric acid. The copolymerizate, thus treated, was then mixed with a saturated solution of $SO_2$ in water and stirred at room temperature until the copolymer dissolved. It was also possible to suspend the dried copolymer in water and then introduce gaseous $SO_2$ into the solution until the solution became saturated with $SO_2$. In this latter procedure it was necessary to stir the mixture at room temperature until the copolymer dissolved. The copolymer produced in this instance contained 25 mol percent acrolein based on monomeric ratios.

Example 2

7.5 ml. of destabilized acrolein and 50 ml. of acrylonitrile were dissolved in 200 ml. of water. This mixture was then acidified with 20 ml. of 2 N sulfuric acid. Then a solution of 15 ml. of hydrogen peroxide (30% by weight) in 100 ml. of water and a solution of 4.6 g. of sodium nitrite in 100 ml. of water were simultaneously added dropwise over a period of 2 hours. The further steps in the procedure were performed as in Example 1. The copolymerizate thus produced was soluble in aqueous solutions of $SO_2$ as described in Example 1 as well as in dimethylformamide or pyridine. The copolymer produced in this example contained 15 mol percent acrolein based on monomeric ratios.

Example 3

0.455 g. of potassium persulfate, 12 ml. of destabilized acrolein and 4 ml. of destabilized methylacrylate were dissolved in 200 ml. of water. To this were added dropwise a solution of 0.288 g. of silver nitrate in 25 ml. of water and the solution was maintained at a temperature of about 20° C. The copolymer precipitated out and was recovered by filtration techniques. It was then dissolved in aqueous solutions of sulfurous acid, as described in Example 1. At a 10% conversion the copolymer contains 20 mol percent of acrolein. The copolymerization parameters amounted to 0.2 for acrolein and 10.0 for the methylacrylate.

Example 4

1.36 g. of potassium persulfate, 10 ml. of destabilized acrolein and 5 ml. of vinyl acetate were dissolved in 200 ml. of water. Then, a solution of 0.85 g. of silver nitrate in 25 ml. of water was added dropwise to the monomer mixture and the temperature was held at about 20° C. The procedure thereafter was the same as in Example 3. The copolymerization parameters for acrolein was 0.1 and 3.3 for the vinyl acetate.

We claim:

1. An aqueous solution of $SO_2$ containing a dissolved copolymer of acrolein and an organic lower aliphatic mono vinyl compound selected from the group consisting of acrylonitrile, methyl methacrylate, and vinyl acetate, said copolymer containing from over 50 to 90% of the vinyl compound constituent and being formed by polymerizing a mixture of acrolein and the organic, lower aliphatic, polymerizable, monomeric mono vinyl compound with the aid of a radical forming catalyst.

2. A solution as in claim 1 in which said vinyl constituent in such copolymer is acrylonitrile and such copolymer contains about 12% of acrolein component.

References Cited in the file of this patent

UNITED STATES PATENTS

| | | |
|---|---|---|
| 2,272,828 | Berg | Feb. 10, 1942 |

FOREIGN PATENTS

| | | |
|---|---|---|
| 611,919 | Great Britain | Nov. 5, 1948 |
| 1,062,937 | Germany | Aug. 6, 1959 |